US011901616B2

(12) United States Patent
Odes

(10) Patent No.: US 11,901,616 B2
(45) Date of Patent: Feb. 13, 2024

(54) SIMPLE ULTRA WIDE BAND VERY LOW PROFILE ANTENNA ARRANGED ABOVE SLOPED SURFACE

(71) Applicant: GM GLOBAL TECHNOLOGY OPERATIONS LLC, Detroit, MI (US)

(72) Inventor: Uriel Zvi Odes, Givaat Shmuel (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 112 days.

(21) Appl. No.: 17/409,646

(22) Filed: Aug. 23, 2021

(65) Prior Publication Data

US 2023/0057392 A1 Feb. 23, 2023

(51) Int. Cl.

*H01Q 9/43* (2006.01)
*H01Q 9/40* (2006.01)
*H01Q 1/48* (2006.01)
*H01Q 5/25* (2015.01)
*H01Q 1/32* (2006.01)
*H01Q 1/38* (2006.01)

(52) U.S. Cl.

CPC ............ *H01Q 1/3275* (2013.01); *H01Q 1/48* (2013.01); *H01Q 5/25* (2015.01); *H01Q 9/40* (2013.01); *H01Q 9/43* (2013.01); *H01Q 1/38* (2013.01)

(58) Field of Classification Search

CPC .. H01Q 9/43; H01Q 9/40; H01Q 9/42; H01Q 9/0407; H01Q 9/30; H01Q 9/0414; H01Q 7/00; H01Q 7/04; H01Q 9/26; H01Q 9/0421; H01Q 1/3283; H01Q 1/3275–3291; H01Q 1/48

See application file for complete search history.

(56) References Cited

U.S. PATENT DOCUMENTS

| | | | | |
|---|---|---|---|---|
| 3,015,101 A * | 12/1961 | Turner | H01Q 9/43 D14/230 |
| 3,170,158 A | 2/1965 | Rotman | |
| 3,778,839 A * | 12/1973 | Kovar | H01Q 11/083 343/895 |

(Continued)

FOREIGN PATENT DOCUMENTS

| | | |
|---|---|---|
| CN | 101102009 A | 1/2008 |
| CN | 204088560 U | 1/2015 |

(Continued)

OTHER PUBLICATIONS

U.S. Appl. No. 17/409,543, filed Aug. 23, 2021, Odes.
U.S. Appl. No. 17/409,586, filed Aug. 23, 2021, Odes.
U.S. Appl. No. 17/409,627, filed Aug. 23, 2021, Odes.

*Primary Examiner* — Ricardo I Magallanes

(57) ABSTRACT

An ultra wide band antenna includes an antenna body including a first tapered portion that tapers between a first edge and a second edge, wherein the first edge is arranged above a first location of a sloped surface by a predetermined gap. A first portion is located above the sloped surface and including a first edge and a second edge. The first edge of the first portion extends from the second edge of the first tapered portion. A second tapered portion tapers between a first edge and a second edge, wherein the first edge of the second tapered portion extends from the second edge of the first portion. The second edge of the second tapered portion is connected at a second location of the sloped surface located vertically below the first location.

17 Claims, 4 Drawing Sheets

(56) References Cited

U.S. PATENT DOCUMENTS

| | | | | |
|---|---|---|---|---|
| 4,506,267 | A * | 3/1985 | Harmuth | H01Q 17/001 343/846 |
| 5,307,081 | A * | 4/1994 | Harmuth | H01Q 1/04 343/788 |
| 5,926,150 | A * | 7/1999 | McLean | G01R 29/0821 343/846 |
| 6,166,698 | A * | 12/2000 | Turnbull | B60C 23/061 343/700 MS |
| 6,208,306 | B1 * | 3/2001 | McLean | H01Q 9/28 343/747 |
| 6,483,463 | B2 | 11/2002 | Kadambi et al. | |
| 6,950,068 | B2 | 9/2005 | Bordi et al. | |
| 8,736,506 | B1 | 5/2014 | Brock et al. | |
| 11,158,947 | B2 * | 10/2021 | Delaveaud | H01Q 9/36 |
| 2001/0022559 | A1 * | 9/2001 | Takahashi | H01Q 1/3291 343/826 |
| 2002/0186169 | A1 * | 12/2002 | Iwai | H01Q 21/30 343/702 |
| 2003/0038749 | A1 | 2/2003 | Chen | |
| 2004/0169609 | A1 * | 9/2004 | Song | H01Q 1/241 343/846 |
| 2005/0007284 | A1 * | 1/2005 | Komatsu | H01Q 13/106 343/713 |
| 2006/0176221 | A1 | 8/2006 | Chen et al. | |
| 2006/0227051 | A1 * | 10/2006 | Yamamoto | H01Q 1/38 343/846 |
| 2006/0256025 | A1 * | 11/2006 | Askildsen | H01Q 9/28 343/807 |
| 2007/0024511 | A1 | 2/2007 | Li et al. | |
| 2007/0229367 | A1 * | 10/2007 | Fukui | H01Q 9/40 343/846 |
| 2007/0273607 | A1 * | 11/2007 | Chen | H01Q 1/48 343/893 |
| 2008/0122700 | A1 | 5/2008 | Mei | |
| 2009/0027294 | A1 | 1/2009 | Bourry et al. | |
| 2009/0040125 | A1 * | 2/2009 | Azulay | H01Q 9/42 343/829 |
| 2009/0102729 | A1 * | 4/2009 | Wang | H01Q 1/36 343/702 |
| 2010/0026593 | A1 | 2/2010 | Chang et al. | |
| 2010/0315303 | A1 * | 12/2010 | Kearney | H01Q 9/42 343/848 |
| 2012/0026047 | A1 * | 2/2012 | Ferrero | H01Q 13/103 343/711 |
| 2012/0081252 | A1 | 4/2012 | Pan | |
| 2012/0169554 | A1 * | 7/2012 | Behdad | H01Q 9/40 343/742 |
| 2013/0050057 | A1 * | 2/2013 | Hayashi | H01Q 1/38 343/893 |
| 2014/0002317 | A1 * | 1/2014 | Wunsch | H01Q 19/30 343/713 |
| 2014/0285382 | A1 | 9/2014 | Dobric | |
| 2015/0280317 | A1 * | 10/2015 | Morin | H01Q 9/28 343/795 |
| 2015/0380826 | A1 * | 12/2015 | Yang | H01Q 5/25 343/846 |
| 2016/0006114 | A1 * | 1/2016 | Jamaly | H01Q 1/48 343/789 |
| 2016/0233590 | A1 * | 8/2016 | Ng | H01Q 21/205 |
| 2017/0025766 | A1 * | 1/2017 | Su | H01Q 1/36 |
| 2017/0047660 | A1 | 2/2017 | Manry, Jr. | |
| 2017/0141480 | A1 | 5/2017 | Ng et al. | |
| 2017/0256849 | A1 * | 9/2017 | Cohen | H01Q 17/008 |
| 2017/0317409 | A1 * | 11/2017 | Ayatollahi | H01Q 21/28 |
| 2018/0045822 | A1 * | 2/2018 | Wötzel | H01Q 9/28 |
| 2018/0090834 | A1 * | 3/2018 | Ng | H01Q 21/0006 |
| 2018/0219282 | A1 * | 8/2018 | Hefele | H01Q 1/42 |
| 2018/0269584 | A1 * | 9/2018 | Farkas | H01Q 5/25 |
| 2018/0323515 | A1 * | 11/2018 | Tang | H01Q 19/10 |
| 2018/0337461 | A1 * | 11/2018 | Kildal | H01Q 9/26 |
| 2018/0358697 | A1 | 12/2018 | Zhou et al. | |
| 2019/0190136 | A1 * | 6/2019 | Sone | H01Q 9/04 |
| 2019/0334242 | A1 | 10/2019 | Wilson | |
| 2020/0006844 | A1 * | 1/2020 | Ortigosa | H01Q 1/3291 |
| 2020/0036075 | A1 * | 1/2020 | Ding | H01Q 1/007 |
| 2020/0220254 | A1 * | 7/2020 | Sayama | H01Q 1/1285 |
| 2020/0251822 | A1 * | 8/2020 | McGough | H01Q 5/15 |
| 2020/0335857 | A1 * | 10/2020 | Shoji | H01Q 1/3283 |
| 2020/0395669 | A1 * | 12/2020 | Forslund | H01Q 19/10 |
| 2022/0043100 | A1 * | 2/2022 | Sanji | E05B 49/00 |
| 2022/0043101 | A1 * | 2/2022 | Sanji | G01S 5/012 |
| 2022/0094065 | A1 * | 3/2022 | Milyakh | H01Q 21/26 |
| 2022/0149524 | A1 * | 5/2022 | Cheng | H01Q 1/50 |

FOREIGN PATENT DOCUMENTS

| | | | |
|---|---|---|---|
| CN | 104701622 | A | 6/2015 |
| CN | 210668675 | U | 6/2020 |
| JP | 6151251 | B2 | 6/2017 |
| KR | 101888399 | B1 | 8/2018 |

* cited by examiner

SIMPLE ULTRA WIDE BAND VERY LOW PROFILE ANTENNA ARRANGED ABOVE SLOPED SURFACE

CROSS-REFERENCE TO RELATED APPLICATIONS

This application is related to U.S. patent application Ser. No. 17/409,543 filed on Aug. 23, 2021 and entitled “SIMPLE ULTRA WIDE BAND VERY LOW PROFILE ANTENNA;” U.S. patent application Ser. No. 17/409,586 filed on Aug. 23, 2021 and entitled “EXTREMELY LOW PROFILE ULTRA WIDE BAND ANTENNA;” and U.S. patent application Ser. No. 17/409,627 filed on Aug. 23, 2021 and entitled “SPIRAL TAPERED LOW PROFILE ULTRA WIDE BAND ANTENNA.” The entire disclosure of the applications referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to antennas and more particularly to ultra wide band antennas.

Vehicles use telematics systems to support wireless telecommunications and information processing. Examples include cellular communications, global positioning system (GPS) navigation, integrated hands-free cell phones, wireless safety communication, vehicle to vehicle (V2V) communication, vehicle to infrastructure (V2I) communication, autonomous driving systems, etc.

The telematics systems transmit and receive data as the vehicle is driven on the road. To facilitate wireless connectivity, the vehicles include one or more antennas that are connected to transmitters and/or receivers of the telematics systems. Examples of antennas that are currently used include mast antennas and shark fin antennas. Various subsystems in the telematics systems transmit and receive on multiple different frequency bands. Therefore, ultra wide band (UWB) antennas are a good candidate for cellular applications.

Manufacturers attempt to create cost-effective, fuel-efficient vehicles with attractive styling. Currently-used antenna designs are typically not desirable from a styling viewpoint. For example, the shark fin antenna may be arranged on the roof of the vehicle above a middle of the rear windshield or on the rear deck lid. As can be appreciated, placing the shark fin antenna in those locations detracts from the external design of the vehicle. These types of antennas typically have a height that is approximately ¼ of a wavelength corresponding to a lowest desired operating frequency.

SUMMARY

An ultra wide band antenna includes an antenna body including a first tapered portion that tapers between a first edge and a second edge, wherein the first edge is arranged above a first location of a sloped surface by a predetermined gap. A first portion is located above the sloped surface and including a first edge and a second edge. The first edge of the first portion extends from the second edge of the first tapered portion. A second tapered portion tapers between a first edge and a second edge, wherein the first edge of the second tapered portion extends from the second edge of the first portion. The second edge of the second tapered portion is connected at a second location of the sloped surface located vertically below the first location.

In other features, the first portion has a rectangular shape. The first tapered portion and the second tapered portion have a trapezoidal shape. An antenna feed is connected to the first edge of the first tapered portion. Tapered sides of the first tapered portion and the second tapered portion form an angle in a range from 30 to 60 degrees relative to a line parallel to sides of the first portion. A ground plane is connected to the second tapered portion between the antenna body and the sloped surface. The sloped surface is conducting.

In other features, a stepped surface is arranged on the sloped surface and includes a first surface and a second surface. An antenna feed point is connected to the first edge of the first tapered portion above the first surface of the stepped surface. The first tapered portion is arranged perpendicular to the first surface of the stepped surface. At least one of a non-conducting cover and a spoiler is arranged over the ultra wide band antenna.

An ultra wide band antenna includes a sloped surface and a stepped surface arranged on the sloped surface. An antenna body includes a first tapered portion that tapers between a first edge and a second edge, wherein the first edge is arranged above a first location of the stepped surface. A first portion is located above the sloped surface and including a first edge and a second edge, wherein the first edge of the first portion extends from the second edge of the first tapered portion. A second tapered portion tapers between a first edge and a second edge. The first edge of the second tapered portion extends from the second edge of the first portion. The second edge of the second tapered portion is connected to a second location of the sloped surface located vertically below the first location.

In other features, the first portion has a rectangular shape. The first tapered portion and the second tapered portion have a trapezoidal shape. An antenna feed is connected to the first edge of the first tapered portion.

In other features, tapered sides of the first tapered portion and the second tapered portion form an angle in a range from 30 to 60 degrees relative to a line parallel to sides of the first portion. The stepped surface includes a first surface and a second surface and wherein the first tapered portion is arranged perpendicular to the first surface of the stepped surface. A ground plane is connected to the second tapered surface between the antenna body and the sloped surface. The sloped surface is conducting. At least one of a non-conducting cover and a spoiler is arranged over the ultra wide band antenna.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An ultra wide band (UWB) antenna according to the present disclosure has a low profile to allow the antenna to be incorporated into a variety of vehicle locations. The low profile allows the UWB antenna to be less noticeable. For example, the UWB antenna can be arranged above a sloped surface of the vehicle and concealed below a structure such as a non-conducting cover such as a spoiler or a center high mounted stop light (CHMSL) assembly on a roof of the vehicle, although the antenna can be mounted in other locations.

The shape of the antenna is relatively simple, which makes manufacturing of the antenna both simple and low cost. In some examples, the antenna includes a flat metal portion that is stamped, bent and attached to a sloped or curved surface such as a sloped conducting or non-conducting portion of a roof to create a low profile UWB antenna.

In some examples, the UWB antenna is mounted above the sloped surface of the roof (or other sloped surface or non-conducting surface of the vehicle). If the sloped surface is non-conducting, the UWB antenna can include a ground plane. Alternately, if the sloped surface is conducting, the UWB antenna can have a ground plane that connects to or overlays the conducting sloped surface. An antenna feed point (corresponding to a lower end of a first tapered portion of the UWB antenna) is located vertically higher than a grounded point of the UWB antenna (corresponding to a lower end of a second tapered portion of the UWB antenna that is grounded below the feed point). Arranging the grounded point of the antenna body below the feed point allows lower frequencies to be supported. Having the feed point high up helps higher frequencies to be propagated, radiated, and/or transmitted from the UWB antenna at a section closer to the top of the roof with less shadowing from the roof, which allows coverage of angles around the horizon. Higher frequencies tend to be more sensitive than low frequencies to a shadowing effect of the sloped surface.

In some examples, the antenna feed point is connected to the lower end of the first tapered portion above a stepped surface arranged on the sloped portion of the roof or other sloped conducting structure. When used, this arrangement improves coverage for higher frequencies.

Figure 1:
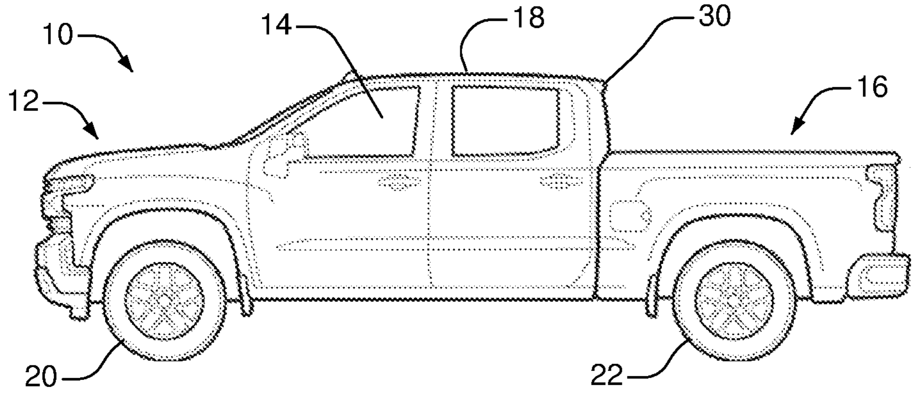
FIG. 1 is a side view of an example of a vehicle such as a pickup truck illustrating a concealed location for mounting an ultra wide band antenna according to the present disclosure.

Referring now to FIG. 1, a vehicle 10 is shown. The UWB antenna is described below in conjunction a particular mounting position on a pickup truck. While the pickup truck is shown, the UWB antenna according to the present disclosure can be used in other locations of passenger vehicles, in other types of vehicles, and/or in non-vehicle implementations with a sloped conducting or non-conducting surface. In some examples, the UWB antenna described herein can include a ground plane if needed (either with or without a stepped surface).

The vehicle 10 includes a hood 12 enclosing an engine or electric motor and a rear end 16 such as a trunk or hatch of a passenger vehicle or bed of a truck. The vehicle 10 includes a passenger compartment 14 and a roof 18 extending over the passenger compartment 14. A portion 30 of the roof includes a sloped or curved surface (as shown in FIGS. 2 and 2B). Alternately, the sloped surface can be non-conducting and the UWB can include a ground plane either with or without a stepped surface. In some examples, the sloped conducting portion may be enclosed by a cover or spoiler (as shown in FIGS. 3A and 3B). The vehicle includes front wheels 20 and rear wheels 22.

Figure 2A:
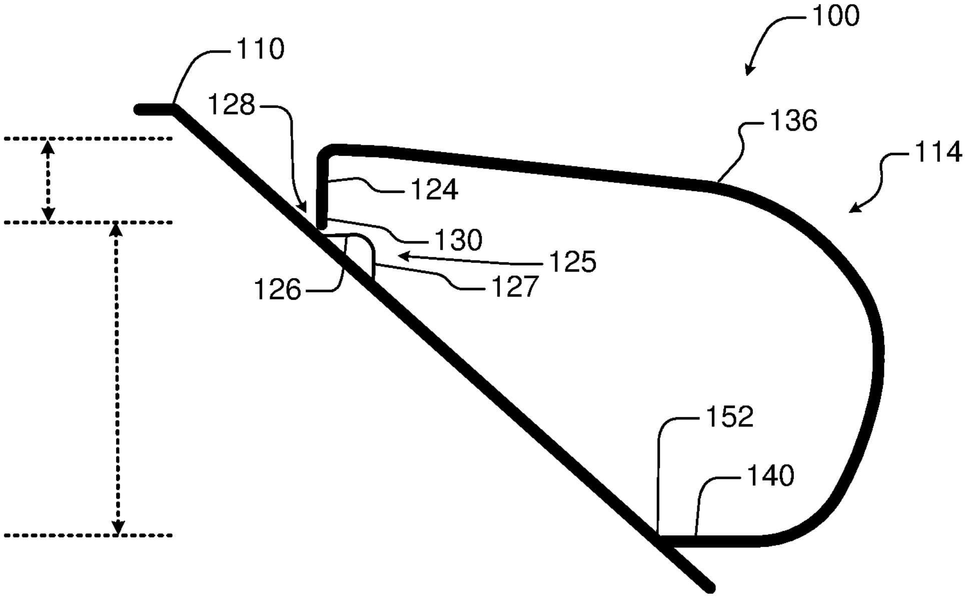
FIGS. 2A and 2B are side views of examples of an ultra wide band (UWB) antennas arranged above a sloped surface according to the present disclosure.
Figure 2B:
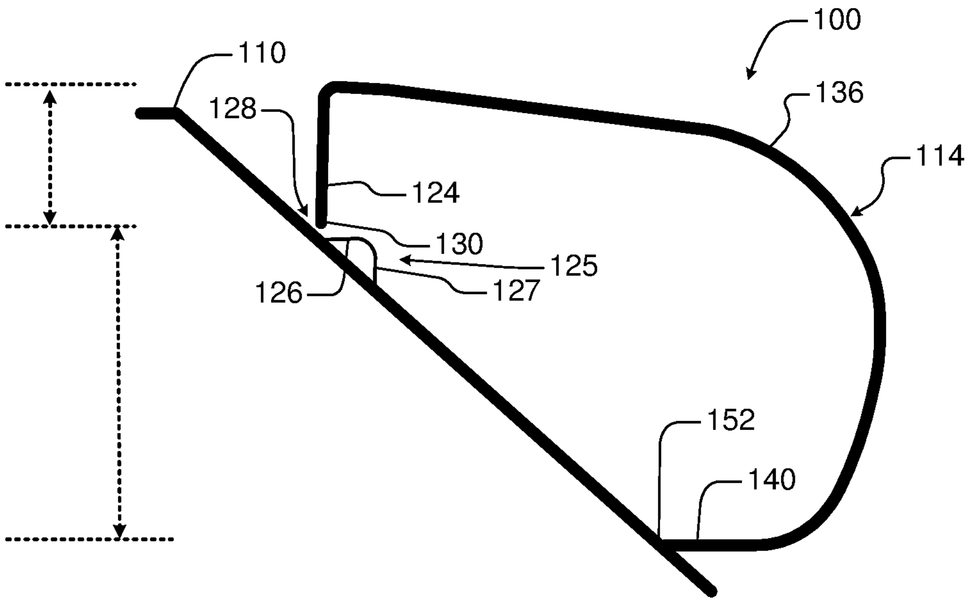
Figure 3A:
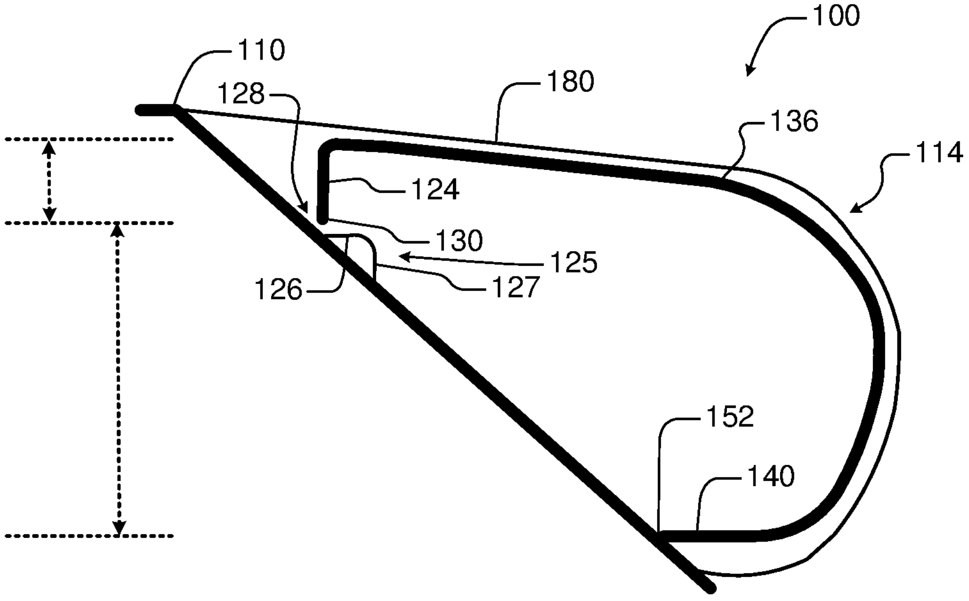
FIGS. 3A and 3B are side views of the UWB antennas of FIG. 2 with a non-conducting cover or spoiler arranged over the UWB antenna according to the present disclosure.
Figure 3B:
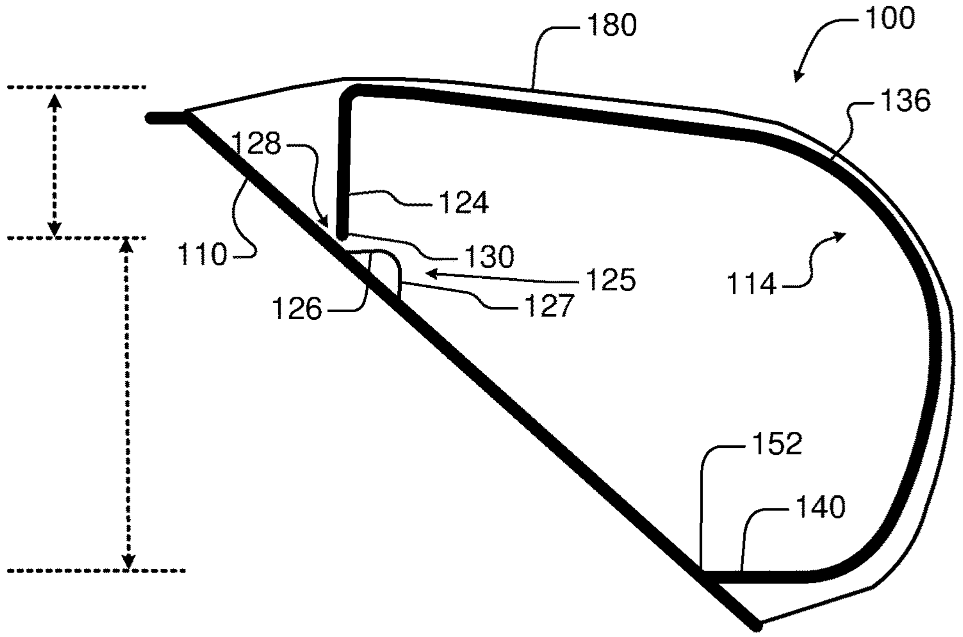

Referring now to FIGS. 2A and 2B, an ultra wide band (UWB) antenna 100 includes an antenna body 114 that is arranged above a sloped surface 110 (that can be conducting or non-conducting) and a stepped surface 125. In FIG. 2A, the antenna body 114 lies below an upper edge of the sloped surface 110. In FIG. 2B, the antenna body 114 extends above the sloped surface 110.

Figure 5:
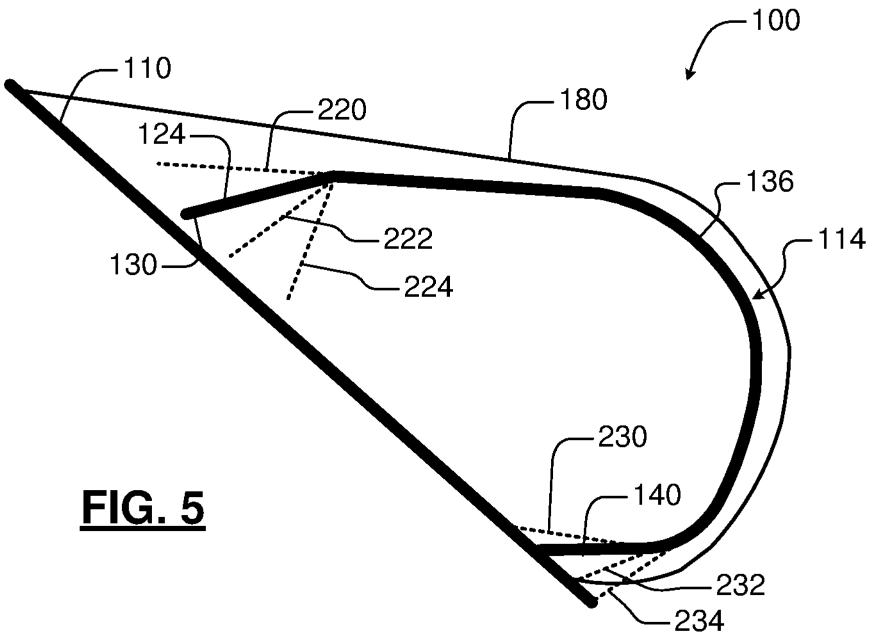
FIG. 5 is a side view of another example of an UWB antenna according to the present disclosure.

The antenna body 114 further includes a first tapered portion 124. When used, the stepped surface 125 extends horizontally on the sloped surface 110. The stepped surface 125 includes first and second surfaces 126 and 127, respectively. In some examples, the first surface 126 is generally perpendicular to the first tapered portion 124. Since the sloped surface 110 is arranged at an angle, the first tapered portion 124 helps to form an approximately acute angle relative to the stepped surface 125. In other examples, the first tapered portion 124 can form other angles relative to the sloped surface 110 (or a relative to a ground plane) (as shown in FIG. 5).

Figure 4:
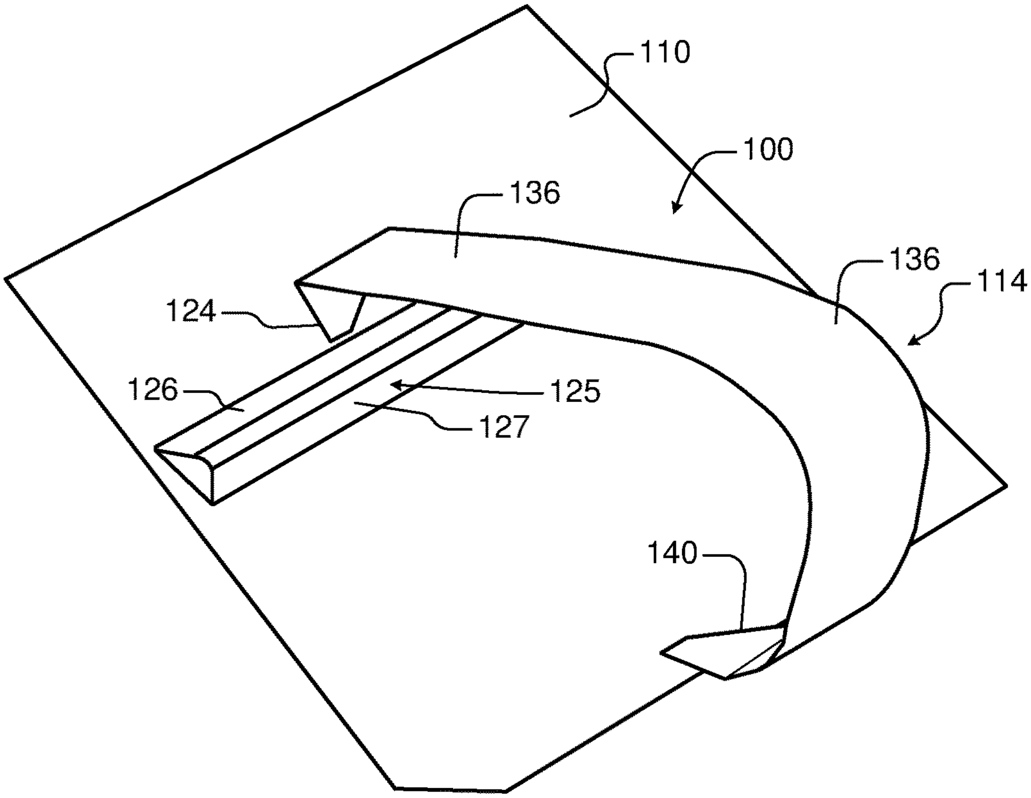
FIG. 4 is a perspective view of the UWB antenna of FIG. 2 according to the present disclosure.

A gap 128 is defined between a lower edge 130 of the first tapered portion 124 and the sloped surface 110, the stepped surface 125 and/or a ground plane of the UWB antenna. Opposite side surfaces of the first tapered portion 124 taper outwardly in a direction away from the sloped surface 110 (as can be seen in FIG. 4). In some examples, a horizontal width of the first tapered portion 124 monotonically increases as a distance above the sloped surface 110 increases.

In some examples, an antenna feed (not shown) is connected to the antenna body 114 near a lower edge 130 of the first tapered portion 124. For example only, the antenna feed can include an inner conductor of a coaxial cable (not shown) and a woven copper shield (not shown) of the coaxial cable can be connected to the sloped surface 110 and/or a ground plane. While a specific type of antenna feed is described for illustration purposes, the antenna body 114 can be fed using other antenna feed arrangements. For example, the inner conductor of the antenna feed can be arranged parallel to the sloped surface or ground plane rather than perpendicular to the sloped surface or ground plane near the antenna feed location.

A first portion 136 of the antenna body is spaced above the sloped surface 110 and extends from the first tapered portion 124 to a second tapered portion 140. The first portion 136 has a curved side profile that extends between the first tapered portion 124 and the second tapered portion 140. The second tapered portion 140 can also form different angles relative to the sloped surface 110 (as shown in FIG. 5) and/or a ground plane. Some of the first portion 136 runs parallel to the sloped surface 110. While specific side profiles are shown, the first portion 136 can have any suitable curvature. In some examples, the first portion 136 may have a rectangular cross-section when viewed from the top, although the first portion 136 can have non-parallel side surfaces that are either symmetric or asymmetric. The second tapered portion 140 is connected to the sloped surface 110 (or ground plane) at a location vertically below the first tapered portion 124 and the feed location.

In some examples, the first tapered portion 124 has a height H. In some examples, the lower edge 130 of the first tapered portion 124 is located a distance d above the lower portion 152 of the second tapered portion 140. Opposite side surfaces of the second tapered portion 140 taper inwardly in a manner similar to opposite side surfaces of the first tapered portion 124 (see FIG. 4).

The antenna body 114 can be made entirely of conducting material such as metal. Alternately, one or more portions of the antenna body 114 can include a supporting surface that is made of a non-conducting material and inner and/or outer layers made of a conducting material. In some examples, the first portion 136 has a rectangular shape (when flattened) and the first and second tapered portions 124 and 140 have a trapezoidal shape. In some examples, a horizontal width of the second tapered portion 140 monotonically increases as a distance above the sloped surface 110 increases.

The first tapered portion 124 of the antenna body 114 acts similar to a monopole antenna, the first portion 136 acts as a capacitor and the second tapered portion 140 acts as an inductor. In some examples, the antenna body 114 is located below a non-conducting cover or spoiler (as shown in FIG. 3).

The antenna can operate over an ultra wide band. For example, dimensions of the antenna may be designed for 617 MHz and the UWB antenna can operate in a first frequency band from 617 MHz to 1 GHz, a second frequency band from 1.7 GHz to 2.7 GHz and a third frequency band from 3.3 GHz to 6 GHz, although other frequencies can be covered. For example, the dimensions of the antenna may be determined based on the lowest frequency and the beginning of higher frequencies. For example, dimension H and D may be determined for 617 MHz and H (which is/can be much smaller) is designed for 1.7 GHz.

Without being tied to any theory, the dimension H acts similar to a monopole for frequencies from and above 1.7 GHz. While the combined dimensions H and d support the lower frequencies starting at 617 MHz in this example. In some examples, tapered sides of the first tapered portion and the second tapered portion form an angle in a range from 30 to 60 degrees relative to a line parallel to sides of the first portion, although other angles can be used.

Referring now to FIGS. 3A and 3B, the UWB antennas 100 in FIGS. 2A and 2B can be located between the sloped surface 110 (or ground plane) and an outer cover or spoiler 180. The outer cover or spoiler 180 is made of a non-conducting material to allow transmission through the outer cover 180 while blocking the UWB antenna 100 from view during operation of the vehicle 10.

Referring now to FIG. 4, additional details of the UWB antenna 100 are shown. In some examples, a width of the first portion 136 of the UWB antenna 100 is generally fixed from the first tapered portion 124 to the second tapered portion 140, although the width can be varied as well. The first tapered portion 124 and the second tapered portion 140 taper from the width of the first portion 136 to narrower widths connected to the feed point or grounded to the sloped surface 110.

Referring now to FIG. 5, the shape of the UWB antenna 100 can be varied for a given implementation and/or varied to alter the performance of the UWB antenna 100. The first tapered portion 124 can have a slight bend or no bend as it transitions from the first portion 136 to the first tapered portion. The first tapered portion 124 can meet the sloped surface at various angles as shown by different dotted lines 220, 222 and 224. Likewise, the second tapered portion 124 can also meet the sloped surface at various angles as shown by different dotted lines 230, 232 and 234.

In some examples, the UWB antenna has an approximate bandwidth ratio of $F_{high}/F_{low}$=1:10, with $F_{high}$ being the highest frequency that the UWB antenna is matched to and $F_{low}$ being the lowest frequency the UWB antenna is matched to.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An ultra wide band antenna, comprising:
an antenna body including:
a first tapered portion that tapers between a first edge and a second edge of the first tapered portion, wherein the first edge is arranged above a first location of a sloped surface by a predetermined gap;
an intermediate portion located above the sloped surface and including a first edge and a second edge, wherein the first edge of the intermediate portion extends from the second edge of the first tapered portion;
a second tapered portion that tapers between a first edge and a second edge of the second tapered portion, wherein the first edge of the second tapered portion extends from the second edge of the intermediate portion, and wherein the second edge of the second tapered portion is connected at a second location of the sloped surface located vertically below the first location; and a stepped surface arranged on the sloped surface and including a first surface and a second surface, wherein an antenna feed point is connected to the first edge of the first tapered portion above the first surface of the stepped surface, wherein the first tapered portion is arranged perpendicular to the first surface of the stepped surface.

2. The ultra wide band antenna of claim 1, wherein the intermediate portion has a rectangular shape.

3. The ultra wide band antenna of claim 1, wherein the first tapered portion and the second tapered portion have a trapezoidal shape.

4. The ultra wide band antenna of claim 1, wherein an antenna feed is connected to the first edge of the first tapered portion.

5. The ultra wide band antenna of claim 1, wherein tapered sides of the first tapered portion and the second tapered portion form an angle in a range from 30 to 60 degrees relative to a line parallel to sides of the intermediate portion.

6. The ultra wide band antenna of claim 1, further comprising a ground plane connected to the second tapered portion between the antenna body and the sloped surface.

7. The ultra wide band antenna of claim 1, wherein the sloped surface is conducting.

8. The ultra wide band antenna of claim 1, further comprising at least one of a non-conducting cover and a spoiler is arranged over the antenna body.

9. An ultra wide band antenna, comprising:

a sloped surface;

a stepped surface arranged on the sloped surface; and an antenna body including:

a first tapered portion that tapers between a first edge and a second edge of the first tapered portion, wherein the first edge is arranged above a first location of the stepped surface;

an intermediate portion located above the sloped surface and including a first edge and a second edge, wherein the intermediate portion has a curved side profile, and wherein the first edge of the intermediate portion extends from the second edge of the first tapered portion; and a second tapered portion that tapers between a first edge and a second edge of the second tapered portion, wherein the first edge of the second tapered portion extends from the second edge of the intermediate portion, and wherein the second edge of the second tapered portion is connected to a second location of the sloped surface located vertically below the first location.

10. The ultra wide band antenna of claim 9, wherein the intermediate portion has a rectangular shape.

11. The ultra wide band antenna of claim 9, wherein the first tapered portion and the second tapered portion have a trapezoidal shape.

12. The ultra wide band antenna of claim 9, wherein an antenna feed is connected to the first edge of the first tapered portion.

13. The ultra wide band antenna of claim 9, wherein tapered sides of the first tapered portion and the second tapered portion form an angle in a range from 30 to 60 degrees relative to a line parallel to sides of the intermediate portion.

14. The ultra wide band antenna of claim 9, wherein the stepped surface includes a first surface and a second surface and wherein the first tapered portion is arranged perpendicular to the first surface of the stepped surface.

15. The ultra wide band antenna of claim 9, further comprising a ground plane connected to the second tapered portion between the antenna body and the sloped surface.

16. The ultra wide band antenna of claim 9, wherein the sloped surface is conducting.

17. The ultra wide band antenna of claim 9, further comprising at least one of a non-conducting cover and a spoiler arranged over the antenna body.

* * * * *